Jan. 31, 1950     D. J. DAVIS     2,495,891
APPARATUS FOR MEASURING PROPELLER BLADES
Filed May 5, 1944     6 Sheets-Sheet 1
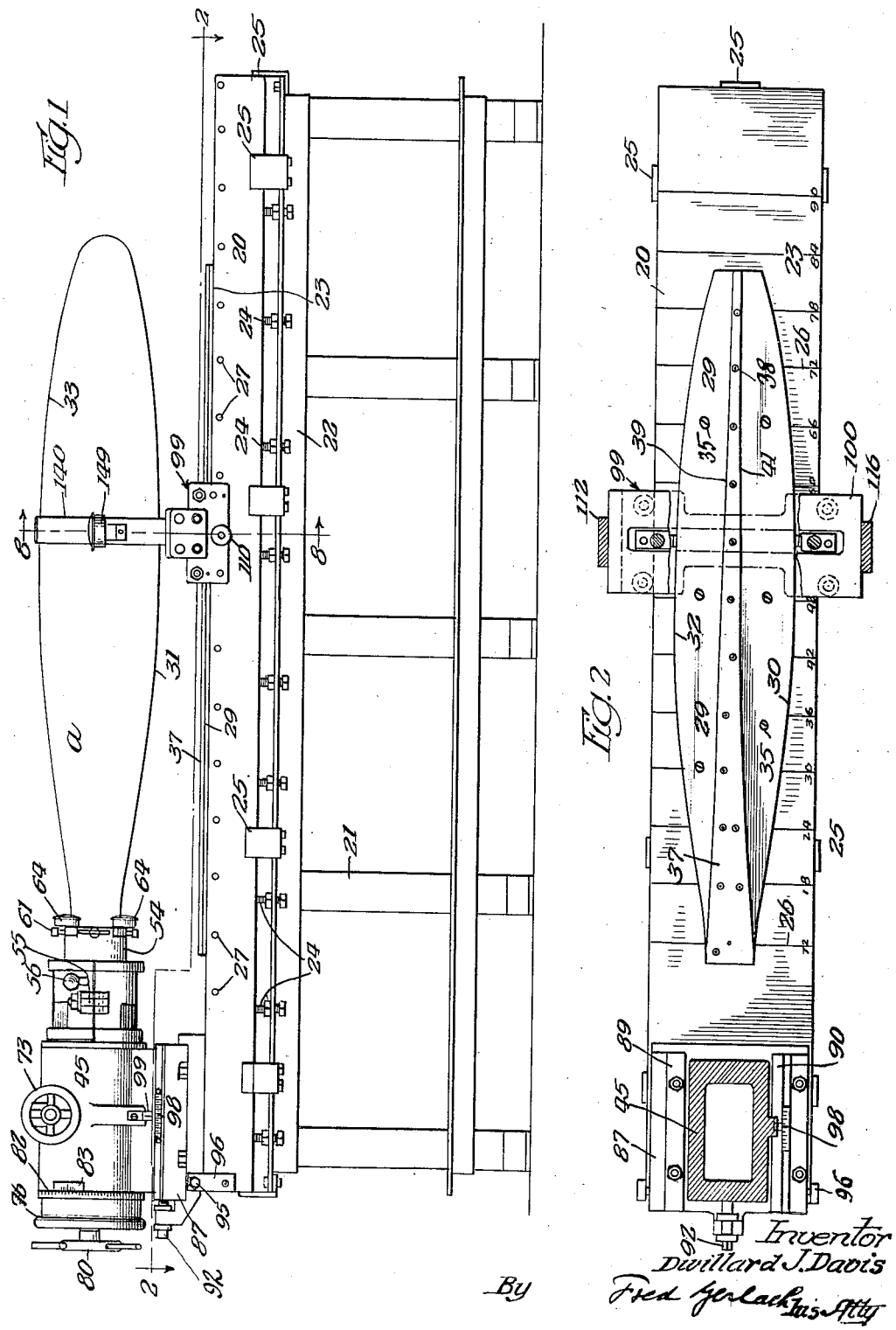
Inventor
Dwillard J. Davis
By Fred Gerlach his Atty

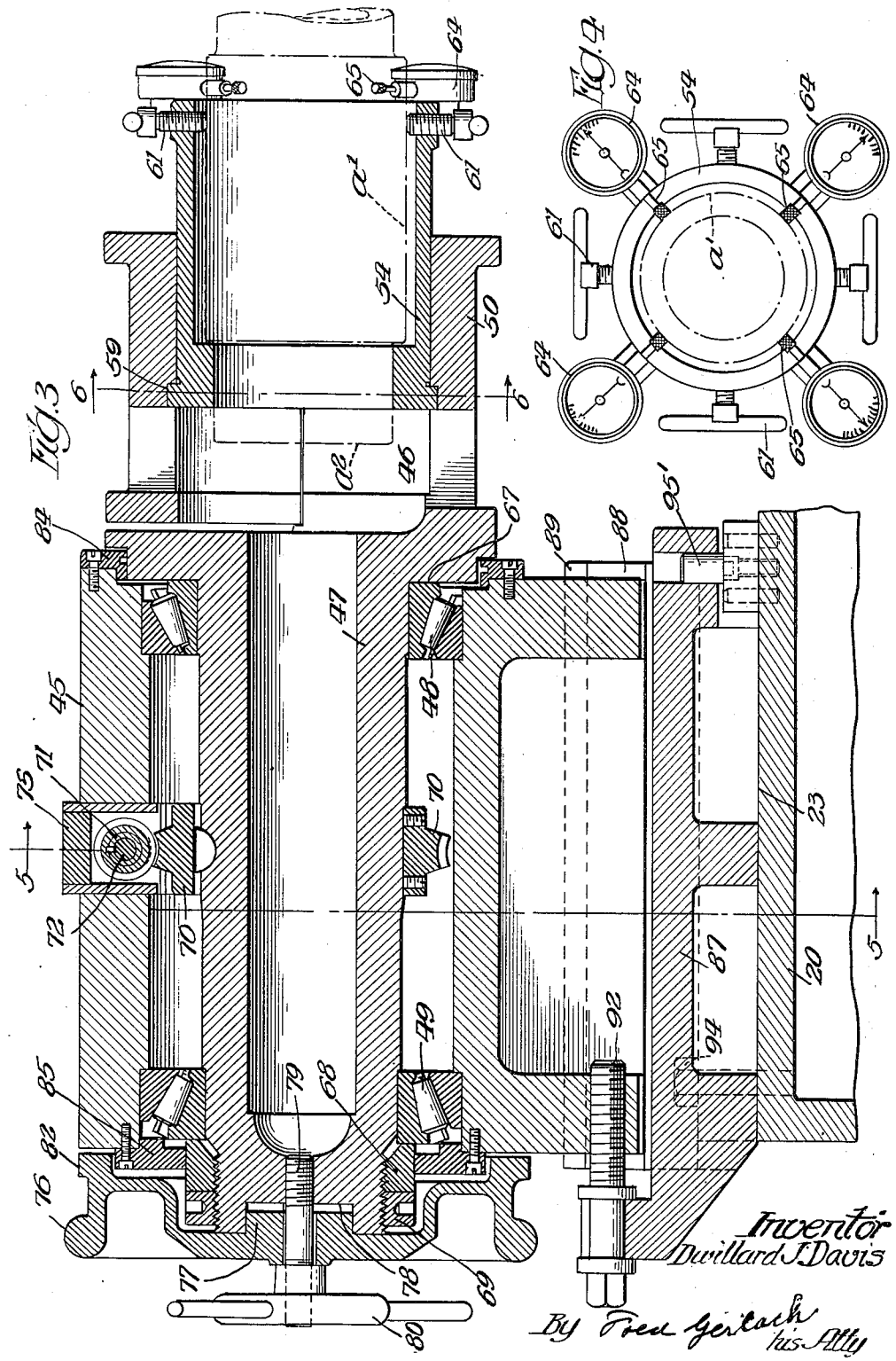

Jan. 31, 1950 D. J. DAVIS 2,495,891
APPARATUS FOR MEASURING PROPELLER BLADES
Filed May 5, 1944 6 Sheets-Sheet 3
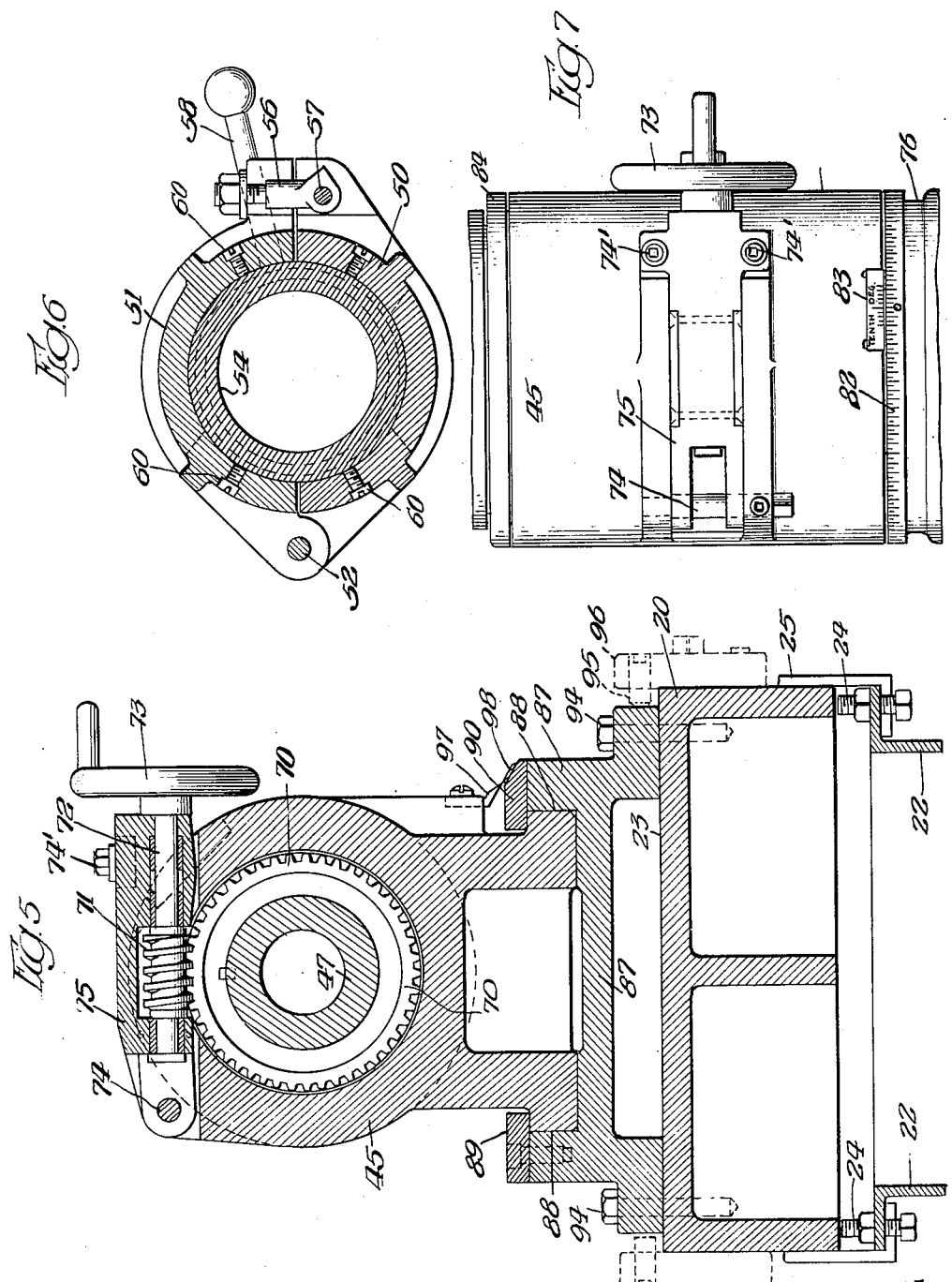
Inventor
D. Willard J. Davis
By Fred Gerlach his Atty

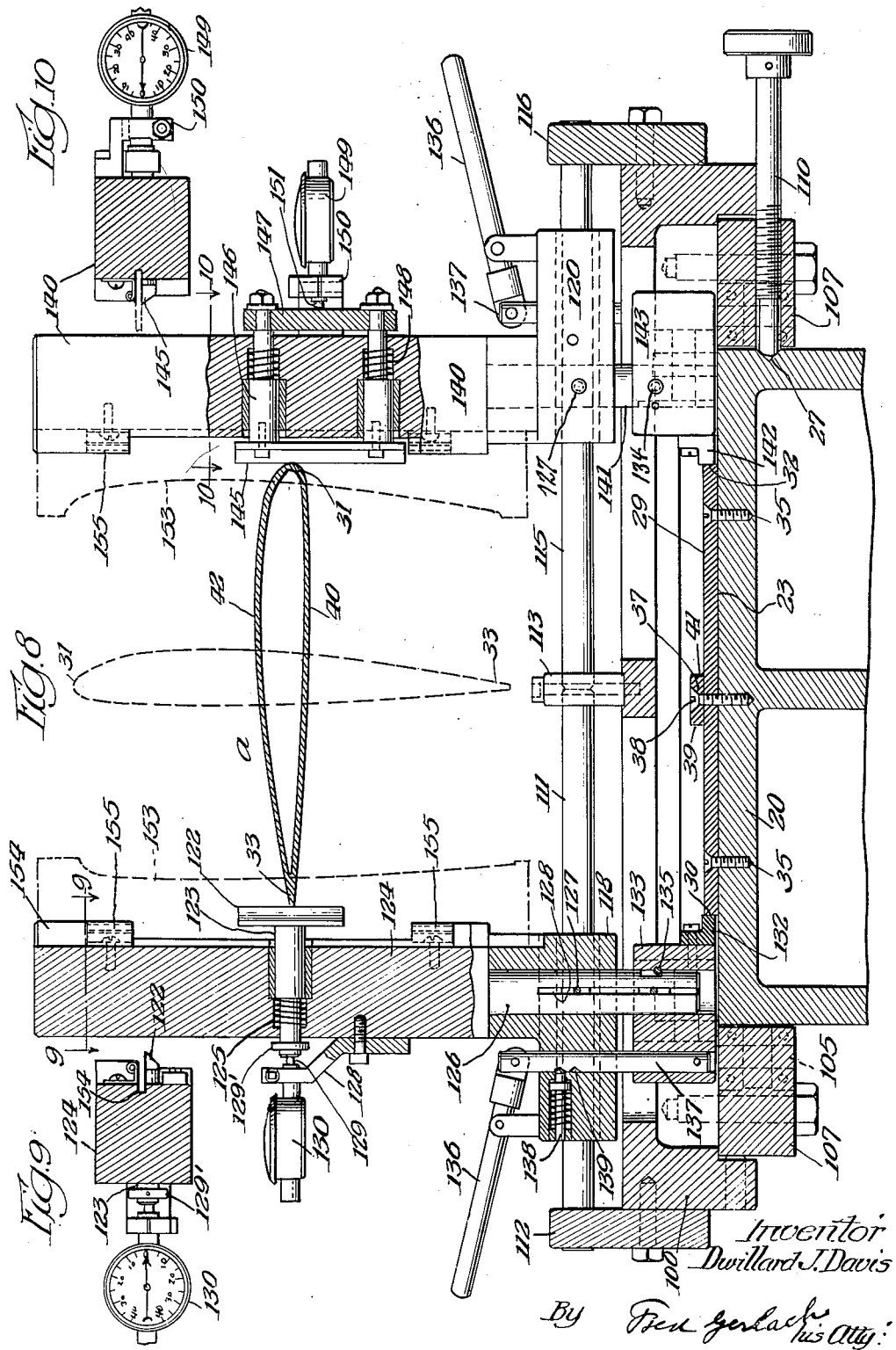

Jan. 31, 1950   D. J. DAVIS   2,495,891
APPARATUS FOR MEASURING PROPELLER BLADES
Filed May 5, 1944   6 Sheets-Sheet 5
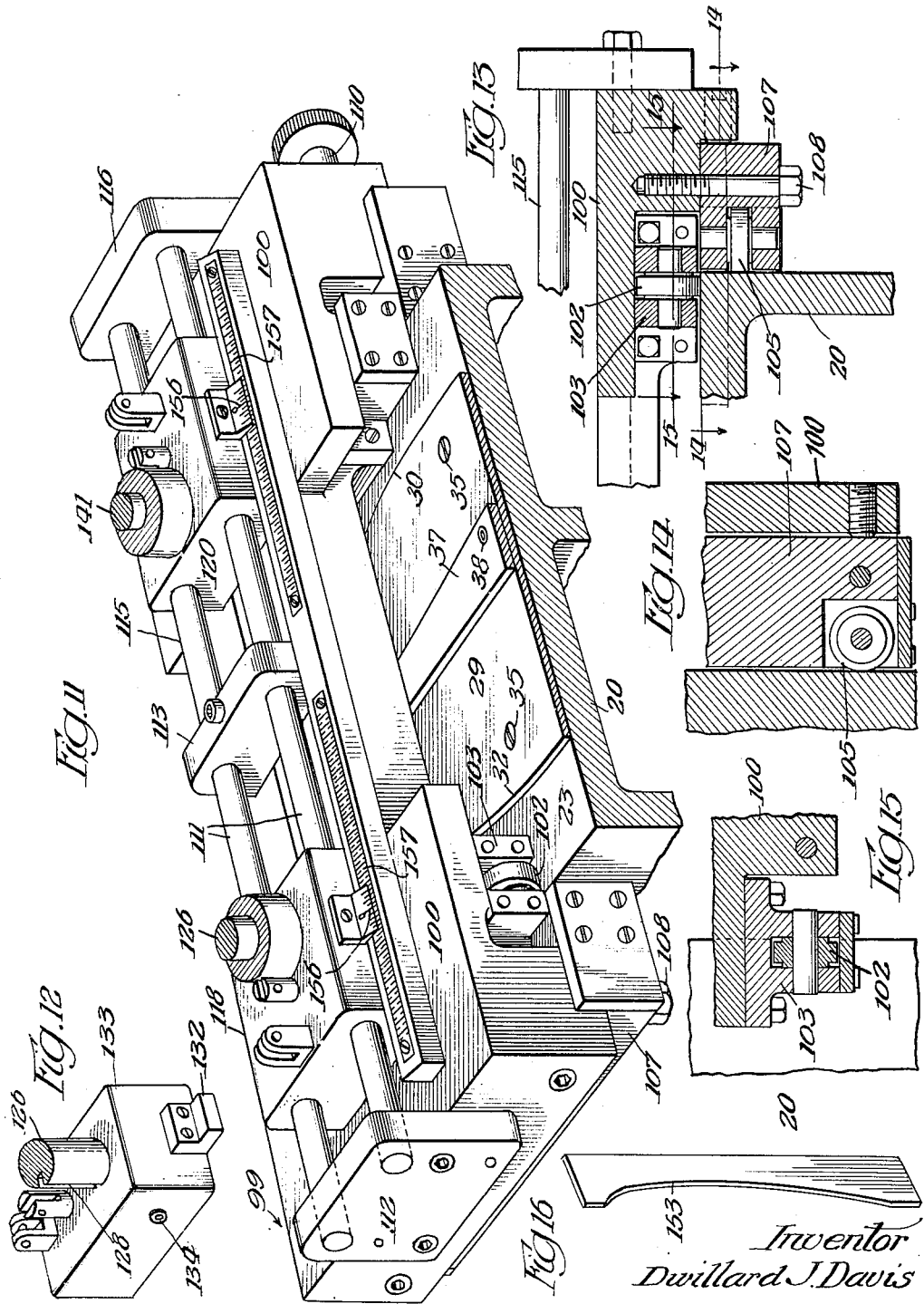
Inventor
Dwillard J. Davis
By Fred Gerlach
his Atty.

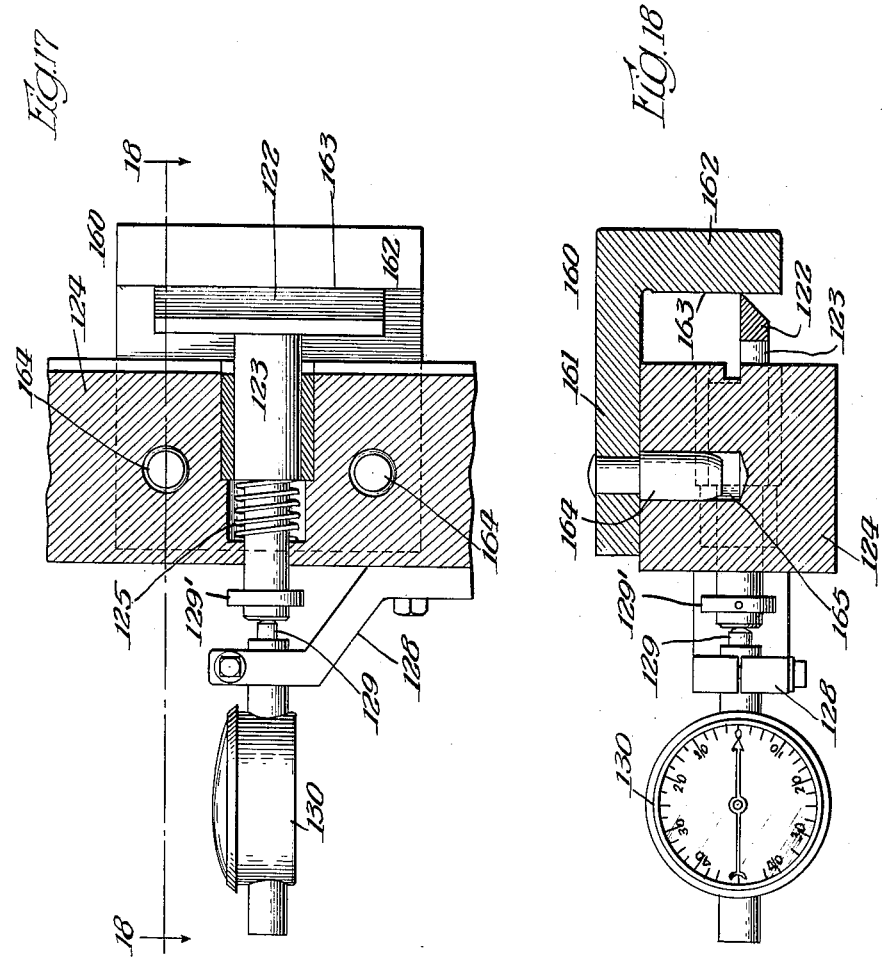

Patented Jan. 31, 1950

2,495,891

UNITED STATES PATENT OFFICE 2,495,891

APPARATUS FOR MEASURING PROPELLER BLADES

Dwillard J. Davis, Detroit, Mich., assignor to Avco Manufacturing Corporation, a corporation of Delaware Application May 5, 1944, Serial No. 534,200

15 Claims. (Cl. 33—174)

The invention relates to apparatus for measuring propeller blades to determine whether their contour and dimensions are correct.

One object of the invention is to provide improved apparatus for measuring propeller blades which reduces the time and the number of operators required for making the measurements to effect a saving in cost of fabrication.

Another object of the invention is to provide improved apparatus whereby the measurements for blade width and blade thickness can be made from templets without requiring calculations of the inaccuracies in the blade.

Another object of the invention is to provide improved apparatus for measuring length, width, thickness, edge alignment, face alignment, blade angles and templet fit of the faces of propeller blades.

A still further object of the invention is to provide improved measuring apparatus which includes templets for the width measurements and thickness measurements on the supporting table so that the measurements for the blade width and blade thickness for each blade can be taken during a single setting of the blade in a rotatable supporting head.

Other objects of the invention will appear from the detailed description.

The invention consists in the several novel features hereinafter set forth and more particularly defined by claims at the conclusion hereof.

In the drawings:

Fig. 1 is a side elevation of an apparatus embodying the invention.

Fig. 2 is a horizontal section taken on line 2—2 of Fig. 1 and illustrating the superposed templets for width and thickness measurements.

Fig. 3 is a longitudinal section of the structure for rotatably supporting the blade from its shank over the templets on the stationary table.

Fig. 4 is an end elevation of the adaptor in which the blade shank is secured and which is removably supported in the chuck carried by the supporting head.

Fig. 5 is a section on line 5—5 of Fig. 3.

Fig. 6 is a section taken on line 6—6 of Fig. 3.

Fig. 7 is a plan of the supporting head and some of the parts carried thereby.

Fig. 8 is a section taken on line 8—8 of Fig. 1, parts being shown in elevation.

Fig. 9 is a section taken on line 9—9 of Fig. 8.

Fig. 10 is a section taken on line 10—10 of Fig. 8.

Fig. 11 is a perspective of the carriage which is movable over the table longitudinally of the blade and on which the measuring devices are mounted.

Fig. 12 is a perspective of one of the shoes for engaging the templets on the fixed table and the carrying bracket for the shoe.

Fig. 13 is a vertical section through one corner of the carriage illustrating the rollers on said carriage.

Fig. 14 is a section taken on line 14—14 of Fig. 13.

Fig. 15 is a section taken on line 15—15 of Fig. 13.

Fig. 16 is a perspective of one of the templets for checking the cross-sectional contour of one of the blade faces.

Fig. 17 is a fragmentary sectional view of one of the columns and the device used in setting one of the indicators in correlation with a knife-bar.

Fig. 18 is a view taken on the line 18—18 of Fig. 17.

The apparatus exemplifying the invention comprises, generally, a fixed table upon which the templets for measuring the blade width and thickness are secured; a supporting head mounted on one end of the table for a rotatable chuck in which the shank of the blade is secured for supporting the working portion of the blade over the templets on the fixed table; a carriage which is mounted for movement longitudinally of the table into a series of longitudinal positions along the blade; bars with knife edges for engaging the blade at opposite sides or edges which are movable over the table with the carriage and movable transversely of the table on the carriage; means for positioning the knife-bars from the templets on the table; and means for measuring the movements of the bars relatively to the templets when they are engaged with the blade and positioned by the templets.

The fixed table 20 on which the blade-supporting structure, the templet and the longitudinally movable carriage are mounted, is preferably formed of a rectangular cast block with a flat top face 23 and straight sides. Table 20 is supported at a convenient elevation on a supporting frame 21 which is formed of structural members, and includes legs and upper angle bars 22. This table rests upon a series of screws 24 which are adjustably supported by the angle bars 22 so that the top face 23 of the table 20 may be maintained in truly horizontal position, and is held laterally by angle-plates 25. The top face 23 is provided with transverse scribe lines 26 for indicating a series of the longitudinal stations along the propeller blade and with tapered sockets 27 in alignment with the scribe lines for spotting the longitudinally movable carriage at corresponding stations.

A templet 29 has a longitudinally extending edge 30 extending along one of its sides corresponding in contour to the leading edge 31 of the propeller blade $a$ to be measured, and a longitudinal edge 32 along its opposite side corresponding to the trailing edge 33 of the blade $a$. The templet 29 is removably secured by screws 35 on the top of the table 20. A templet 37 is superimposed on the templet 29 and is removably secured to the table by screws 38. The templet 37 has a longitudinal edge 39 along one of its sides which conforms to the longitudinal contour of the center of the thrust face 40 of the blade $a$ and along its opposite side a longitudinally extending edge 41 which conforms to the longitudinal contour of the center of the suction face 42 of the blade $a$. Templets 29 and 37 are removably secured to the fixed table 20 so that they can be interchanged with templets for blades of different lengths and shapes. The templets are mounted one on top of the other on the fixed table 20 so they may be alternately used for thickness and width measurements of the blade by the measuring devices hereinafter set forth, while the blade is rotated to different angular positions.

The means for supporting the blade over the fixed table comprises a head 45; a chuck 46 provided with a trunnion or shaft 47 which is journaled in roller bearings 48 and 49 which are mounted in the head 45 so that the chuck 46 and the blade carried thereby may be rotated on the longitudinal axis of the blade to bring the blade faces into horizontal or vertical position or any intermediate angular position. The chuck 46 comprises a lower semi-cylindrical member 50 which is integrally formed with the shaft 47 and a semi-cylindrical section 51 which is pivoted at 52 to the section 50. These sections are adapted to receive and to fit around a cylindrical adaptor 54. The sections 50 and 51 are adapted to be clamped together to grip the adaptor by a screw 56 which is pivoted at 57 to the section 50. Section 51 of the chuck is provided with a handle 58. The sections 50, 51 of the chuck are provided with an annular groove for receiving an annular rib 59 on the adaptor for holding it against axial movement in the chuck, and are also provided with a series of radial set screws 60 (Fig. 6) for locking the adaptor 54 in the chuck 46. The adaptor 54 is adapted to receive the shank $a'$ of the blade $a$ to be measured and a reduced shank portion $a^2$ which fits in the bore at the inner end of the adaptor. The outer portion of the shank of the blade is adjustably secured by four radial screws 61 so that the blade may be accurately centered in the chuck coaxially with the shaft 47. Four indicators 64 are mounted on the outer end of the adaptor 54 and provided with stems 65 for engaging the periphery of the shank of the blade for indicating any off-center relation of the blade and for aiding the operator while adjusting the screws 61 to secure the blade in its accurately coaxial position with the shaft 47. The chuck is provided with a shoulder 67 which abuts against one end of the bearing 48. A collar 68, which is screw-threaded to the outer end of the shaft 47, has abutting engagement with the inner race member of the bearing 49 for securing shaft 47 and chuck 46 against axial movement in the head 45. A screw-collar 69 is adapted to lock the collar 68 in its adjusted position.

Shaft 47, chuck 46, the adaptor 54 and the blade $a$, when supported therein, are rotatable in the head 45 to position the working faces of the blade generally horizontally for blade width measurements, vertically for thickness measurements, or any intermediate angle. The mechanism for this purpose comprises a worm gear 70 which is keyed to shaft 47; a worm wheel 71 fixed on a cross shaft 72 which is provided with a hand wheel 73 for rotating the worm. Worm 71, its shaft 72 and hand wheel 73 are carried in a member 75 which fits in a slot in head 45 and is pivotally connected by a pin 74 to the head 45 to permit the worm 71 to be disengaged from gear 70 for rotation of the shaft 47 and gear 70 independently of the worm 71 and hand wheel 73. Screws 74' are adapted to secure the pivoted worm carrying member 75 in position to maintain engagement of worm 71 and gear 70. When the worm 71 has been disengaged from gear 70 and hand wheel 76 is locked to shaft 47 by hand wheel 80, shaft 47, chuck 46, adaptor 54 and the blade carried thereby can be quickly rotated to bring the blade into any angular position around its longitudinal axis. A hand wheel 76 is provided with a hub 77 which fits into a socket 78 in the outer end of shaft 47 and is adapted to be secured into locked engagement with said shaft by a hand wheel 80 on a screw 79 which is fixedly threaded into said shaft. Wheel 76 has a peripheral face 82 which is calibrated to cooperate with a calibrated plate 83 fixed to the head 45 for indicating the rotational setting of the chuck member 48 and the blade carried thereby. When the hand wheel 80 has been loosened, the wheel 76 can be rotated relatively to the shaft 47 so the wheel 76 may be set into normal indicating relation with the calibrations on plate 83 in accordance with the angular position of the blade $a$ in the chuck 46. Sealing rings 84 and 85 are provided at the inner and outer ends of the head 45.

Head 45 is slidably supported in a longitudinally extending channel 88 which is formed in a base or bracket 87 and is vertically confined in said channel by bars 89 and 90 (Fig. 5) which overlap ribs on the sides of the head. Head 45 can be adjusted in bracket 87 longitudinally of the fixed table 20 by a screw 92 to vary the relative longitudinal position of the blade carried by the chuck in the head relatively to the templets 29 and 37 on the table 20 to bring the longitudinal stations of blades of varying length into longitudinal alignment with the scribe lines 26 and the stations on the table 20. A calibrated bar 98 is fixed to bar 90 on the base 87 and an index 97 is fixed to the head 45 for measuring the longitudinal movement of the head from the point in which the head should be positioned for a blade of the correct length. This provides means for measuring variations in the length of the blade and also means for adjusting the blade and its supporting structure longitudinally of the table to bring the blade into correct longitudinal relation with the templets 29 and 37 on the fixed table 20. The bracket 87 is secured and positioned by bolts 94 (Fig. 3) and a dowel pin 95' on the top of the fixed table 20 and may be spotted into accurately centered transverse relation on the table 20 by screws 95 which are threaded to plates 96 which are secured to the sides of the table 20.

A carriage, generally designated 99, is longitudinally movable over the fixed table 20 for supporting a pair of measuring devices for blade-width and blade-thickness and setting the devices at different, or at any, longitudinal stations on the blade and the templets 29 and 37. Carriage 99 comprises a frame 100 which extends across the table 20 over the templets 29 and 37, and is vertically supported by rollers 102 which are mounted in brackets 103 which are secured in recesses in the underside of the corner portions of the frame 100. The frame is guided laterally by rollers 105 which are mounted in recesses in end-bars 107 which are secured by screws 108 to the frame 100. The bars 107 may be adjusted to accurately position the rollers 106 for engagement with the side faces of the table 20 by screws 108 (Fig. 13). The carriage frame 100 is provided with a screw 110 which extends through and is threaded to one of the bars 107 and is adapted to enter the recesses 27 in one side of the fixed table 20 to lock the carriage frame at any of the longitudinal stations indicated by the scribe lines 26. A pair of parallel guide rods 111 are supported in a plate 112 secured to one end of the frame 100, and in a central bridge plate 113 which is also secured to frame 100. A pair of guide rods 115 are mounted in an end-plate 116 which is secured to the side of frame 100 and in the bridge plate 113. A supporting member or block 118 for the measuring device for the blade-width along the trailing edge and the blade-thickness along the thrust face of the blade is mounted on rods 111 and slidable thereon between plates 112 and 113. A supporting member or block 120 for the measuring device for the blade-width along the leading edge and the blade-thickness along the suction face of the blade is mounted on rods 115 and slidable thereon between plates 116 and 117. These blocks 118 and 120 exemplify means for slidably supporting the measuring devices transversely of the fixed table 20 and to and from the axis of the blade from which the measurements are to be taken.

The measuring device carried by the block 118 comprises a vertical bar 122 which is provided with a vertically extending knife-edge for engaging the blade and a stem 123 which is horizontally slidable transversely of the fixed table 20 in a column 124 which is movable with and fixedly supported in block 118. The column 124 is seated on the block 118 and provided with a downwardly extending stem 126 which extends vertically through said block centrally between the rods 111 and is secured against rotation and vertical movement in said block by a screw 127 and a key which extends into a vertical groove 128 in said stem. A follower or shoe 132 is carried on the lower end of the stem of column 124 by a bracket 133 for engaging the templets on the table and positioning said column and the bar 122 conformably to the edges 30 and 39 of the templets 29 and 37, respectively. The stem 123 of bar 122 is pressed by a spring 125 toward the transverse center of the table and is adapted to operate a gauge 130 which is fixedly supported on the column 124 by a clamp-bracket 128 and is provided with an operating stem 129 when bar 122 is shifted against the force of spring 125 by engagement of its knife-edge with the blade. A stop-collar 129' on stem 123 limits the movement of the bar 122 toward the longitudinal axis of the blade by spring 125. Stem 129 of the gauge is responsive to the sliding movements of the measuring bar 122 to operate the gauge 130 to indicate the movement of the knife-bar 122 from its normal position and measure the movement of the knife-bar 122 inwardly or outwardly from the position in which it is vertically aligned with the inner edge of the shoe 132 and edge 32 of templet 29 when the knife-bar is engaged with the blade and shifted by the blade while the shoe is engaged with said templet. The gauge 130 is correlated with the knife-edge of bar 122 to register zero when said knife-edge is in engagement with the blade and is in exact vertical alignment with the inner edge of the shoe 132 and the edge of the templet when it is engaged by the shoe. When this occurs, the blade at the point engaged by the knife-bar 122 will be correctly dimensioned conformably to the engaged templet. When the knife-bar is moved inwardly by its spring 125 as a result of a minus dimension of the blade, or forced outwardly as the result of a plus dimension on the blade, the indicator of the gauge will register the minus or plus dimension and its magnitude. This renders unnecessary any calculation by the operator in these measurements of the blade. The shoe 132 is vertically adjustable into position to engage either the edge 30 of the templet 29, which conforms to the contour of the trailing edge of the blade, or the edge 41 of the templet 37 which conforms to the contour of the pressure face of the blade. The bracket 133 to which the shoe 132 is secured is slidably mounted for this purpose on the lower end of the stem 126 of the column 124. Bracket 133 is vertically slidable on the stem 126 to position the shoe 132 in the horizontal plane of the templet 29 when the blade is rotatively positioned as illustrated in Fig. 8, or in the horizontal plane of the superimposed templet 37 when the blade is rotated substantially 90° from said position, so that the column 124 and knife-bar 122 may be positioned transversely of the table 20 by the edge 30 of templet 29 or the edge 39 of templet 37. Bracket 133 is movable between its raised and lowered positions by a lever 136 which is fulcrumed on block 118 and a rod 137 pivoted to said lever and slidably mounted in the block 118. A spring-pressed detent 138 in the block 118 engages V-shaped notches 139 in rod 137 to vertically position the bracket 137 for engagement of the shoe 132 with templet 29 or with templet 37. A screw 134 extends into groove 128 in stem 126 to prevent rotation of bracket 133, and a pin 135 limits the vertical movement of said bracket.

A column 140 for supporting the device for measuring the width of the blade at its leading edge and the thickness of the blade at its suction face, is provided with a stem 141 which is secured in the block 120 in the same manner as the column 124 is secured in the block 118. A shoe or follower 142 is secured to the inner side of a bracket 143 which is slidably mounted on the stem 141 of column 140. The bracket 143 is vertically shiftable by a lever 136 and rod 137 of the same construction used for the block 118 for engagement with the edge 39 of the templet 29 or the edge 39 of the templet 37. A bar 145 provided with a knife edge for engaging the leading edge of the blade and for measuring its thickness along the suction face, is secured by screws to a pair of parallel and vertically aligned stems 146 which are mounted in column 140 to slide transversely of the fixed table 20. Stems 146 are fixedly connected by a bar 147 and springs 148 are applied to the stems to press the knife-bar 145 toward the axis of the blade. A gauge 149 is clamped in a bracket 150 which is secured to the column 140 and is provided with a stem 151 which is responsive to the movement of the knife-bar in the column 140.

The gauge 149 is correlated with the knife-edge of bar 145 to register zero when said knife-edge is in engagement with the blade and is in exact vertical alignment with the inner edge of the shoe 142 while the latter is engaged with the edge 32 of the templet 29 which conforms to the leading edge of the blade or with the edge 39 of templet 37 which conforms to the longitudinal contour of the pressure face of the blade. When this occurs, the blade at the point engaged by knife-bar 145 will be correctly dimensioned conformably to the engaged templet. When said knife-bar is moved inwardly by its spring 148 as a result of a minus dimension of the blade, or forced outwardly as the result of a plus dimension of the blade, the indicator of the gauge will register the minus or plus dimension and its magnitude. This renders unnecessary any calculation by the operator in measuring the blade.

Each of the supporting blocks 118 and 120 is provided with a calibrated index 156 which moves over a calibrated or scale bar 157 for convenience in reading the spacing of the knife-bars 122, 145 from the longitudinal axis of the blade.

The apparatus is also adapted to be used to facilitate the checking of the cross-sectional contour of the blade faces by means of a series of templets 153 which are shaped respectively to conform to the different cross-sectional contours of the blade faces at the stations along the length of the blade in which the carriage 99 is set for measuring the blade from templets 29 and 37. For holding the templets 153 at said stations and moving them to engage the blade, each of the columns 124 and 140 is provided with a vertical groove 154 at one side of and contiguous to the knife-bars 122, 145, respectively. These templets 153 are exemplified in Fig. 16 and each consists of plates which removably fit the grooves 154 and are adapted to be held therein by resilient gripping members 155. While measuring the width of the blade at the several stations, the templets 153 are removed from the grooves 154. The grooves 154 are located at the side faces of the knife-edges so that the templets 153 will engage the blade substantially at the line of engagement of the knife-bars with the blade. The templets 153 are used while the blade is rotatively positioned at right angles to that shown in Fig. 8 and may be used while the carriage 99 is set for making the thickness-measurements of the blade or may be removed from the columns if desired.

The operation of the apparatus will be as follows: the shank a' of the blade a to be measured and checked is inserted into the adaptor 54 as illustrated by dotted lines in Fig. 3, and the adaptor is placed into and clamped in the chuck 46 and the chuck is then locked to secure the adaptor against axial movement and rotation in the chuck. The screws 61 can be adjusted to accurately center the shank of the blade in the chuck, the gauges 64 serving to aid the operator in spotting and securing the blade in its central position. The wheel 76 can be loosened by screw 79 and hand wheel 80 to permit rotation of the blade and the chuck in the head 45 to the rotative position of the blade for making the blade width measurements and setting the wheel 76 so that the calibrations on surfaces 82 and plate 83 will register zero and rotation of the blade from said position will be correctly indicated by said calibrations. When so set, the wheel 76 will be locked by hand wheel 80 and screw 79 for rotation with the chuck and blade. If the longitudinal stations on the blade to be measured and checked are not in vertical alignment with the stations or scribe lines 26 on the table 20, screw 92 (Fig. 3) can be adjusted to bring them into accurate vertical alignment. The extent of adjustment necessary for this purpose will be indicated by the calibrations on the bar 90 and the index 97 on the head 45. Variations in the length of the blade can be measured by this adjustment.

Assuming the blade a has been angularly rotated to the position illustrated in Fig. 8, the longitudinally movable carriage will be successively set at the stations indicated by the scribe lines 26 and locked in such positions by the screw 110 (Fig. 11). At each longitudinal station, the posts 124 and 140, which are slidable transversely of the table rods 110, will be shifted toward the blade to cause the shoes 132 and 142 to engage the edges 32 and 30 of the templet 29, respectively. If, while the shoes are so engaged, the leading and trailing edges of the shoe conform to said edges of the templet 29, the knife-bars 122 and 145 will be positioned in vertical alignment with said edges of said templet, respectively, and the indications on gauges 130 and 149 will be zero. If the knife-bars 122, 124 are moved inwardly of the edges 32 and 30, respectively, by the springs acting thereon as a result of a deficiency in the width of the blade, the gauges 130 and 149 will be operated to indicate the deficiency in width and its magnitude at each edge of the blade and without calculation on the part of the operator. If there is an excess of width at either of the edges of the blades, the knife-bars engaging it will be forced outwardly and the gauges will be operated to indicate the excess width and its magnitude to the operator without calculation. When the width of the blade across the leading and trailing edges has been thus measured at all of the desired longitudinal stations of the blade, the chuck 46 will be rotated 90° either by means of hand wheel 73, worm 71 and gear 70 or directly by hand wheel 76 when the worm 71 is disengaged from gear 70 to set the blade for measurement of its thickness. The operator will then shift levers 136 to raise brackets 133 and 143 and the shoes 132 and 142 carried thereby, above the templet 29 and into the horizontal plane of the templet 37, at each longitudinal station, the blade should correspond in thickness with the edges 39 and 41 of the templet 37. The posts 124 and 140 are then shifted at each station into engagement with the edges of the templet 37, respectively, and the knife-bars 122 and 145 when engaged with the blade, will operate the gauges 130 and 149, respectively, to indicate zero if the blade thickness is correct in conformity with the templet 37 or to indicate plus or minus thickness relatively to the center of the blade of the respective blade faces without calculations.

As the blade thickness has been measured at each station, the blade will be left in the same rotative position and templets 153, shaped to conform to the cross-sectional shape of the opposite blade faces at the corresponding stations, will be inserted in the grooves 154 in the columns 124 and 140, respectively, and held therein by the resilient gripping devices 155. These columns with the templets 153 therein are then moved together to bring said templets against the blade faces so that deviations in the blade faces from the templets will be visible.

A device is provided for assisting the operator in correlating each of the knife-bars with the shoes on the columns and setting the indicators for the measurements at a zero indication when the bars are aligned with the templet-engaging shoes. These devices are similar in construction. Figs. 17 and 18 illustrate one of these devices applied to the column 124 and knife-bar 122 which comprises an angular calibrating bracket 160 which is substantially rectangular in cross-section and provided with a flange or member 161 which fits against the back side of column 124 and a flange or member 162 which is provided with an accurately ground face 163 which is adapted to be engaged by and position the knife bar relatively to said column. Dowel pins 164, fixedly carried by member 161, are adapted to fit snugly within holes 165 in the column 124 and accurately space the face 163 in exact vertical alignment with the face of the shoe 132 which engages the edge 30 of templet 29 or edge 39 of templet 37. When the calibrating bracket 160 is held on the column and the edge of the knife-bar 122 is engaged with face 163, said edge will be in exact alignment with the templet-engaging edge of shoe 132 and it is desired that the indicator reading should be zero. With the calibrating bracket 160 in place and holding the knife-bar in vertical alignment with the templet-engaging shoe 132, the indicator can be easily adjusted in clamp bracket 128 to register zero so that direct readings can be taken of the variations of the knife-bar relatively to shoe 133 in measuring the blades. In this manner the calibrating bracket 160 facilitates the accurate setting of the indicator with respect to the minus and plus measurements. After the indicators have seen set, the calibrating brackets 160 are removed from the columns.

The invention provides apparatus for expeditiously measuring or checking the blade length, the blade width, the blade thickness, the edge alignment, the face alignment, blade angle, and the templet fit of the cross-sectional contour of the blade faces. The gauges 130 and 149 provide a direct reading of the measurements for the blade width and blade thickness at different stations which require no calculations for recording. The apparatus expedites and simplifies the measuring and checking of the blades and effects a saving in time and labor and the cost of fabrication of the blades.

The invention is not to be understood as restricted to the details set forth, since these may be modified within the scope of the appended claims without departing from the spirit and scope of the invention.

Having thus described the invention, what I claim as new and desire to secure by Letters Patent is:

1. Apparatus for measuring propeller blades comprising, a table, means for supporting a blade from its shank to extend longitudinally over the table, a templet extending longitudinally of and stationarily secured on the table, a carriage movable over the table to different longitudinal blade stations, oppositely disposed elements movable by contact with the blade, means for positioning the elements from the templet, and means for measuring the movement of the elements when they are positioned by the templet and moved by the blade.

2. Apparatus for measuring propeller blades comprising, a table, means for supporting a blade from its shank to extend longitudinally over the table, a templet extending longitudinally of and stationarily secured on the table, a carriage movable over the table to different longitudinal blade stations, oppositely disposed elements movable by contact with opposite portions of the blade, respectively, means for positioning the elements from the templet, and means for measuring the movement of the elements when they are positioned by the templet and moved by engagement with the blade.

3. Apparatus for measuring propeller blades comprising, a table, means for rotatably supporting a blade from its shank to extend longitudinally over the table, a pair of templets extending longitudinally of and stationarily secured over one another on the table, one conforming to the blade width and the other to the blade thickness, a carriage movable over the table to different longitudinal blade stations, oppositely disposed elements movable by contact with opposite portions of the blade, respectively, means for positioning the elements from either of the templets, and means for measuring the movement of the elements when they are positioned by the templets and moved by engagement with the blade.

4. Apparatus for measuring propeller blades comprising, a table, means for supporting a blade from its shank to extend longitudinally over the table, a templet stationarily secured on the table, a carriage movable over the table to different longitudinal blade stations, elements for engaging opposite sides of the blade, respectively, supports for said elements mounted on the carriage to move transversely of and to and from the blade, said elements being mounted in the supports for movement by engagement with the blade, means on the supports for positioning them transversely of the table from the templet, and means for measuring the movement of the elements by the blade while the supports are positioned by the templet.

5. Apparatus for measuring propeller blades comprising, a table, means for supporting a blade from its shank to extend longitudinally over the table, a templet stationarily secured on the table, a carriage movable over the table to different longitudinal blade stations, elements for engaging opposite sides of the blade, respectively, supports for said elements mounted on the carriage, for rectilinear sliding movement transversely of and to and from the blade, said elements being mounted in the supports for sliding movement by the blade, means on the supports for engaging the templet, and positioning the supports transversely of the table from the templet, and means for measuring the movement of the elements in the supports by the blade while the engaging means are engaged with and positioned by the templet.

6. Apparatus for measuring propeller blades comprising, a table, means for supporting a blade from its shank to extend longitudinally over the table, a templet stationarily secured on the table, a carriage movable over the table to different longitudinal blade stations, elements for engaging opposite sides of the blade, respectively, supports for said elements mounted on the carriage to move transversely of and to and from the blade, said elements being mounted in the supports for movement by the blade, spring means for pressing said elements toward the blade, means on the supports for engaging the templet and positioning the supports transversely of the table by the templet, and means for measuring the movement of the elements in the supports by the blade while the engaging means are positioned by the templet.

7. Apparatus for measuring propeller blades comprising, a table, means for supporting a blade from its shank to extend longitudinally over the table, a templet stationarily secured on the table, a carriage movable over the table to different longitudinal blade stations, bars with knife edges for engaging opposite sides of the blade, respectively, supports for said bars mounted on the carriage to move transversely of and to and from the blade, said bars being slidably mounted in the supports for movement by the blade, means on the supports for engaging the templet and positioning the supports transversely of the table by the templet, and means for measuring the movement of the bars in the supports by the blade while the engaging means are positioned by the templet.

8. Apparatus for measuring propeller blades comprising, a table, means for rotatably supporting a blade from its shank to extend longitudinally over the table, a pair of templets stationarily secured on the table, one above the other, a carriage movable over the table to different longitudinal blade stations, elements for engaging the opposite sides of the blade, respectively, supports for said elements mounted on the carriage to move transversely of and to and from the blade, said elements being mounted in the supports for limited movement transversely of the blade, means on the support for engaging the templets and positioning the supports transversely of the table by the templets, means for setting the engaging means for coacting with either of the templets, and means for measuring the movement of the elements in the supports by the blade when the engaging means are positioned by the templets.

9. Apparatus for measuring propeller blades comprising, a table, means for rotatably supporting a blade from its shank to extend longitudinally over the table, a pair of templets stationarily secured on the table, one above the other, one conforming to the leading and trailing edges of the blade and the other conforming to the blade thickness, a carriage movable over the table to different longitudinal blade stations, elements for engaging the opposite sides of the blade, respectively, supports for said elements mounted on the carriage to move transversely of and to and from the blade, said elements being mounted in the supports for limited movement transversely of the blade, means on the supports for engaging the templets and positioning the supports transversely of the table, means for setting the engaging means for coacting with either of the templets, and means for measuring the movement of the elements in the supports by the blade while the supports are positioned by the templets.

10. Apparatus for measuring propeller blades comprising, a table, means for rotatably supporting a blade from its shank to extend longitudinally over the table, a pair of templets stationarily secured on the table, one above the other, a carriage movable over the table to different longitudinal blade stations, elements for engaging the opposite sides of the blade, respectively, supports for said elements mounted on the carriage to move transversely of and to and from the blade, said elements being mounted in the supports for limited movement transversely of the blade, means on the supports for engaging the templets and positioning the supports transversely of the table, means, including levers mounted on the supports, for setting the engaging means for coacting with either of the templets, and means for measuring the movement of the elements in the supports by the blade while the supports are positioned by the templets.

11. Apparatus for measuring propeller blades comprising, a table, means for rotatably supporting a blade from its shank to extend longitudinally over the table, a pair of templets stationarily secured on the table, one above the other, a carriage movable over the table to different longitudinal blade stations, elements for engaging the opposite sides of the blade, respectively, supports for said elements mounted on the carriage to move transversely of and to and from the blade, said elements being mounted in the supports for limited movement transversely of the blade, means on the supports for engaging the templets and positioning the supports transversely of the blade, means slidably carried by the supports for setting the engaging means for coacting with either of the templets, and means for measuring the movement of the elements in the supports by the blade while the supports are positioned by the templets.

12. Apparatus for measuring propeller blades comprising, a table, means for supporting a blade from its shank to extend longitudinally over the table, a templet stationarily secured on the table, a carriage movable over the table to different longitudinal blade stations, supports mounted on the carriage for rectilinear sliding movement transversely of the table and including columns, bars provided with knife-edges for engaging the blade, slidably mounted for movement in the columns, respectively, spring-means for pressing the bars toward the blade, brackets slidably mounted on the lower ends of the columns and provided with shoes for engaging the templets, and positioning the columns transversely of the table, means carried by the supports for setting the shoes for coacting with either of the templets, and gauges for measuring the movement of the bars in the columns by the blade while the shoes engage the templet.

13. Apparatus for measuring propeller blades comprising, a table, means for supporting a blade from its shank to extend longitudinally over the table, templets stationarily secured on the table, one above the other, one of the templets conforming to the leading and trailing edges of the blade and the other conforming to its thickness, a carriage movable over the table to different longitudinal blade stations, supports mounted on the carriage for rectilinear sliding movement transversely of the table and including columns, bars provided with knife-edges for engaging the blade, slidably mounted for movement in the columns, respectively, brackets slidably mounted on the lower ends of the columns, shoes on the brackets for engaging the templets and positioning the columns transversely of the table, means carried by the supports for setting the shoes for coacting with either of the templets, and means for measuring the movement of the elements in the columns by the blade while the shoes are engaged with the templets.

14. Apparatus for measuring propeller blades comprising, a table, means for supporting a blade from its shank to extend longitudinally over the table, a templet stationarily secured on the table, a carriage movable over the table to different longitudinal blade stations, and provided with rollers for engaging the top and sides of the table, and with a pair of guide-rods extending across the table, supports slidably mounted for rectilinear sliding movement on said rods, columns mounted in said supports, bars provided with knife-edges for engaging the blade, slidably mounted for movement in the columns, means on the columns for engaging the templets, and positioning the columns transversely of the table, and means for measuring the movement of the bars relatively to the columns while the shoes are engaged with the templets.

15. Apparatus for measuring propeller blades comprising, a table, means for supporting a blade from its shank to extend longitudinally over the table, a templet stationarily secured on the table, a carriage movable over the table to different longitudinal blade stations, comprising a frame provided with rollers engaging the top and sides of the table and a pair of guide-rods over the frame, blocks mounted on the guide-rods, columns mounted on, movable with, and extending vertically through said blocks, bars provided with knife-edges for engaging the blade, slidably mounted for movement in the columns by the templet, shoes on the lower ends of the columns for engaging the templet, and positioning the columns transversely of the table, and means for measuring the movement of the bars relatively to the columns by the blade while the shoes are engaged with the templet.

DWILLARD J. DAVIS.

REFERENCES CITED

The following references are of record in the file of this patent:

UNITED STATES PATENTS

| Number | Name | Date |
|---|---|---|
| 1,581,566 | Dunbar | Apr. 20, 1926 |
| 1,652,435 | Goodrich | Dec. 13, 1929 |
| 2,238,782 | Roche | Apr. 15, 1941 |
| 2,433,421 | Bowness | Dec. 30, 1947 |

FOREIGN PATENTS

| Number | Country | Date |
|---|---|---|
| 128,619 | England | July 3, 1919 |
| 661,230 | Germany | June 14, 1938 |